United States Patent [19]

Waber

[11] Patent Number: 4,461,594
[45] Date of Patent: Jul. 24, 1984

[54] ROTATABLY ADJUSTABLE AND LOCKABLE CONNECTOR

[76] Inventor: Morris L. Waber, 3006 Coy Ave., Kalamazoo, Mich. 49001

[21] Appl. No.: 315,915

[22] Filed: Oct. 28, 1981

[51] Int. Cl.³ .............................................. F16C 11/00
[52] U.S. Cl. ..................... 403/59; 403/104; 403/316; 403/320; 403/381; 248/662; 248/647; 248/125; 248/122
[58] Field of Search .............. 248/647, 656, 657, 662, 248/669, 124, 123.1; 403/331, 381, 338, 336, 335

[56] References Cited

U.S. PATENT DOCUMENTS

| | | | |
|---|---|---|---|
| 669,673 | 3/1901 | Averbeck | 403/338 X |
| 1,543,769 | 6/1925 | Hewlett et al. | 248/656 |
| 2,004,561 | 6/1935 | Becker et al. | 403/152 X |

Primary Examiner—Ramon S. Britts
Assistant Examiner—Blair M. Johnson
Attorney, Agent, or Firm—Austin A. Webb

[57] ABSTRACT

A wheeled carriage has an upright column with a laterally projecting and vertically adjustable arm thereon. The projecting end of the arm has a dove-tail connector thereon rotatably adjustable in a horizontal plane; a tubular feed screw support has a mating dove-tail part on its bottom side engageable with the connector. The end of the feed screw support has a second dove-tail connector thereon and rotatably adjustable in a vertical plane. A bracket attachable to the motor of an electric drill has a second mating dove-tail part engageable with the second connector with the shaft of the drill chuck aligned with the axis of the tubular support. Two spaced tubular chucks are mounted on opposite sides of the tubular support to receive and releasably lock anchor cables parallel to the drill. The dove-tail parts mating with the connectors have threaded recesses opening normally to connectors; and slots opening laterally and radially into the recesses. Clamp plugs threaded into the recesses each have an axial slot in their periphery and an internally threaded transverse bore aligned with the slot. Locking pins have threaded ends passed through the radial slots in the mating dove-tail parts and the slots in the associated clamp plugs and into the bores, providing 180 degrees clamping adjustment of the plugs against the dove-tail connectors. The pins have tapered mid-sections that will expand the sides of the slots in the plugs and lock the threads on the plugs when the pins are rotated on their axes.

A modification interposes a horizontally rotatable connector bar with a mating dove-tail part on its side, and a dove-tail connector on one end, between the arm on the upright and bracket supporting the drill motor.

Manual and power driven feed screw supports are disclosed.

6 Claims, 11 Drawing Figures

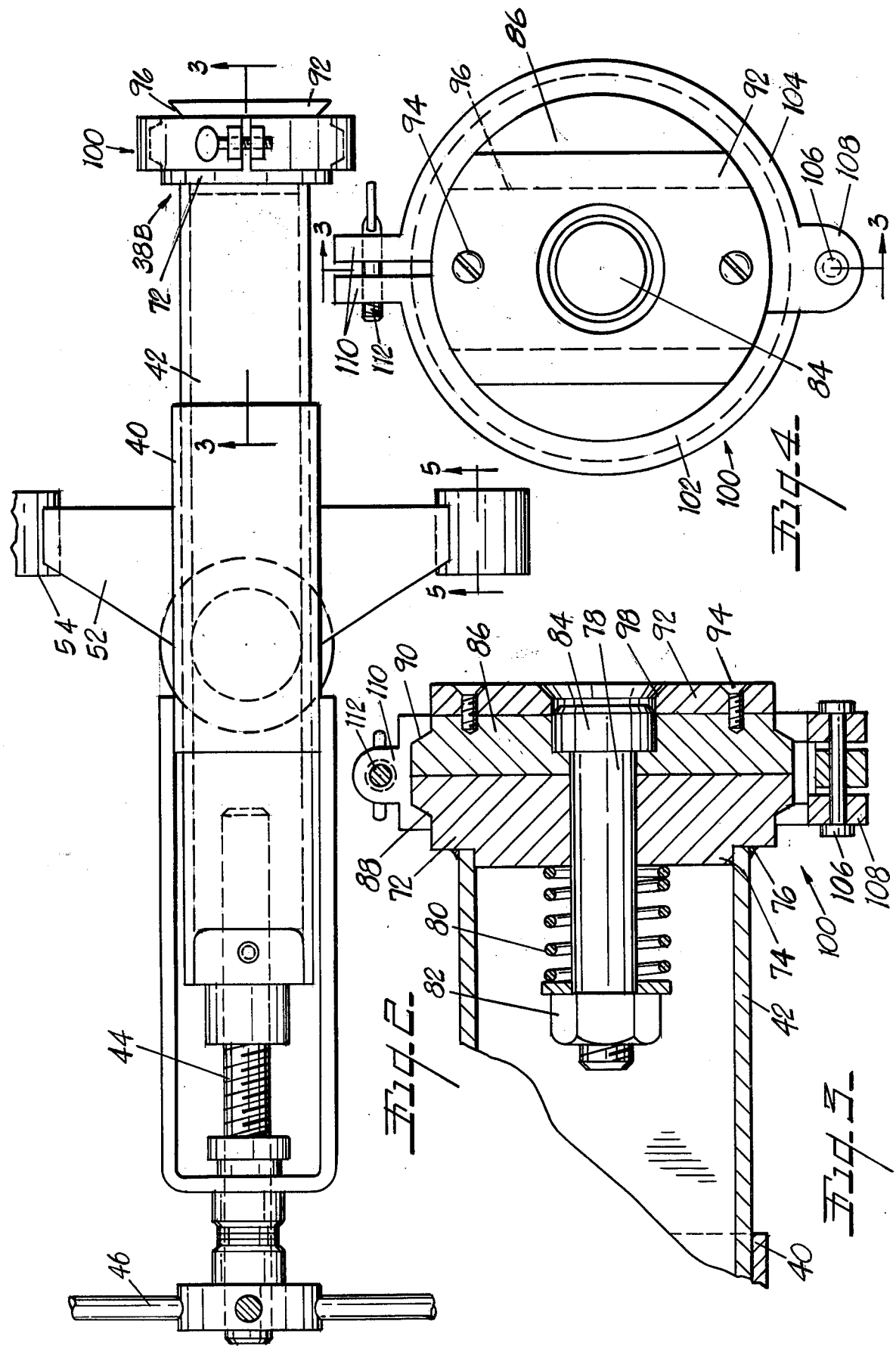

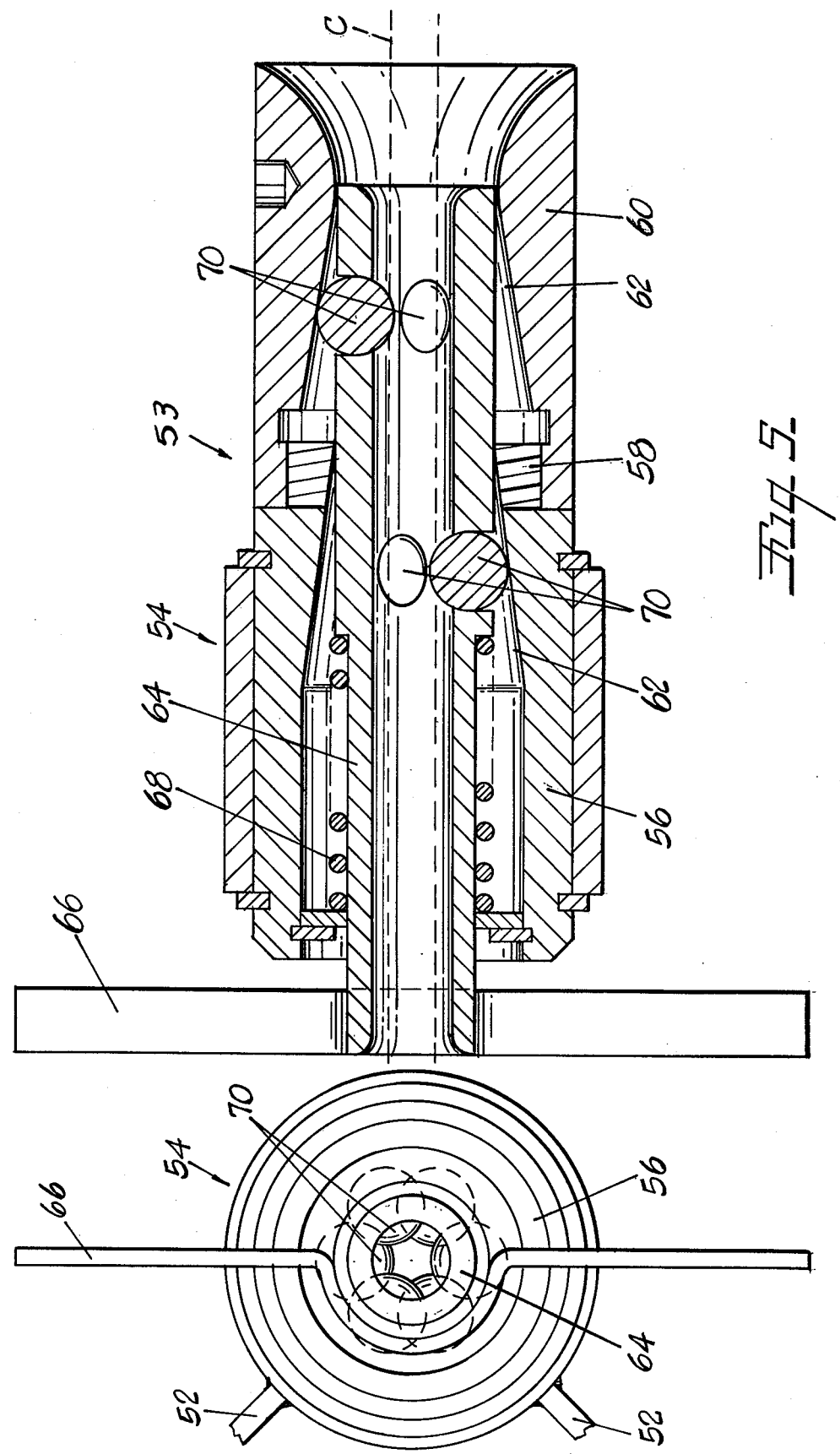

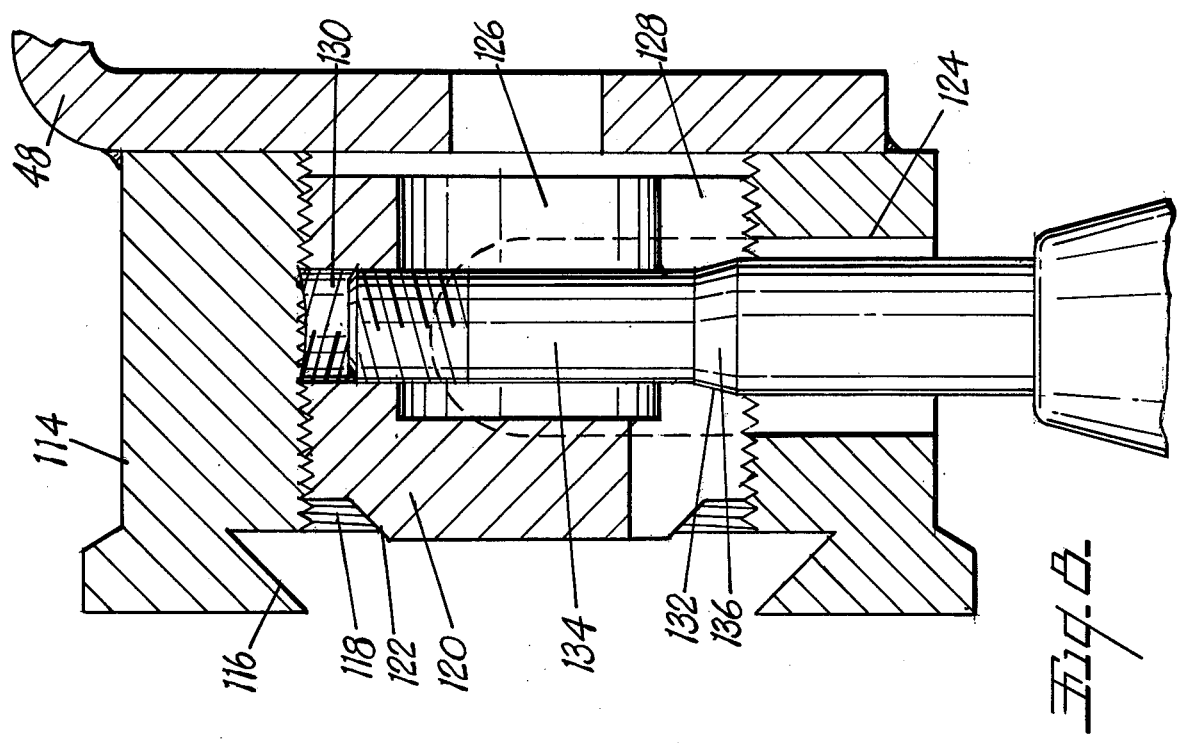
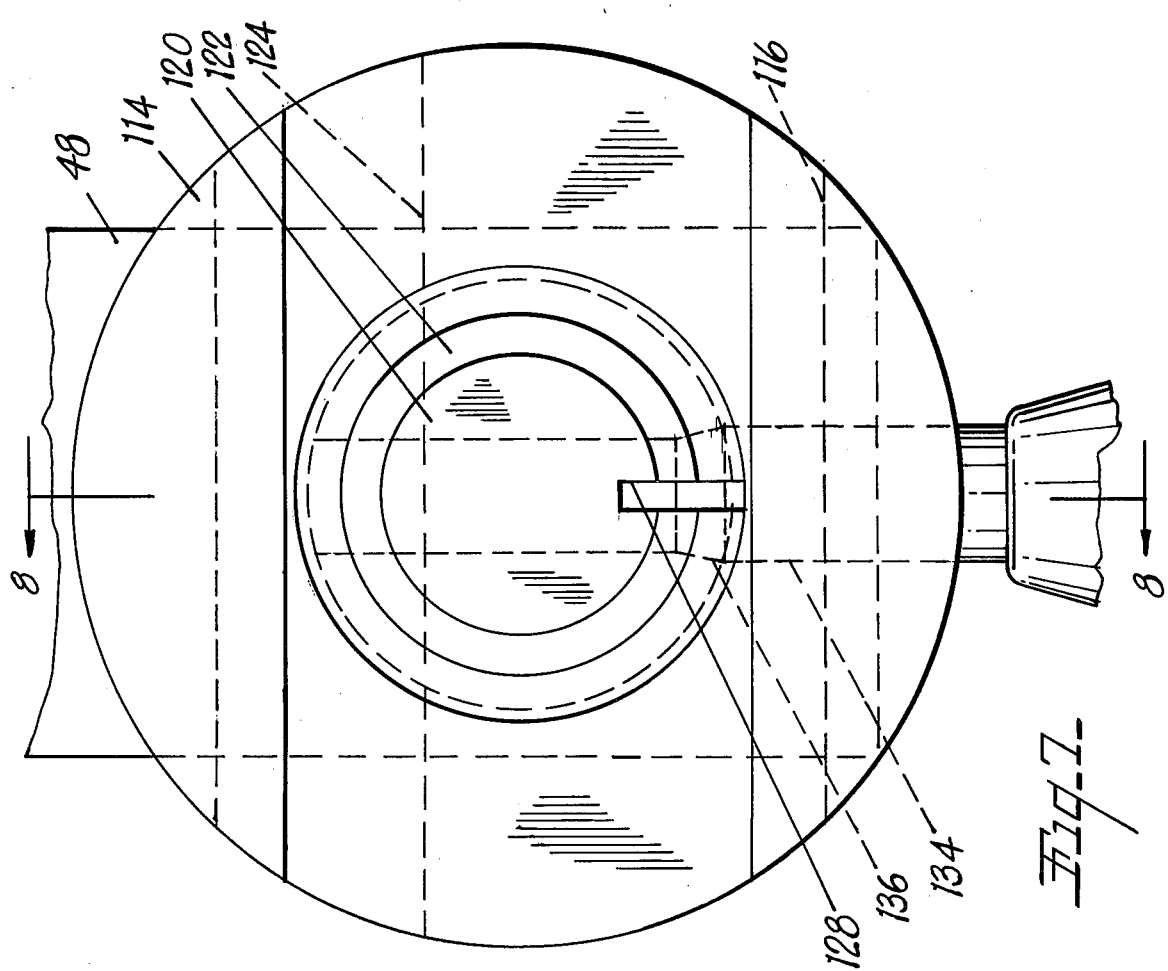

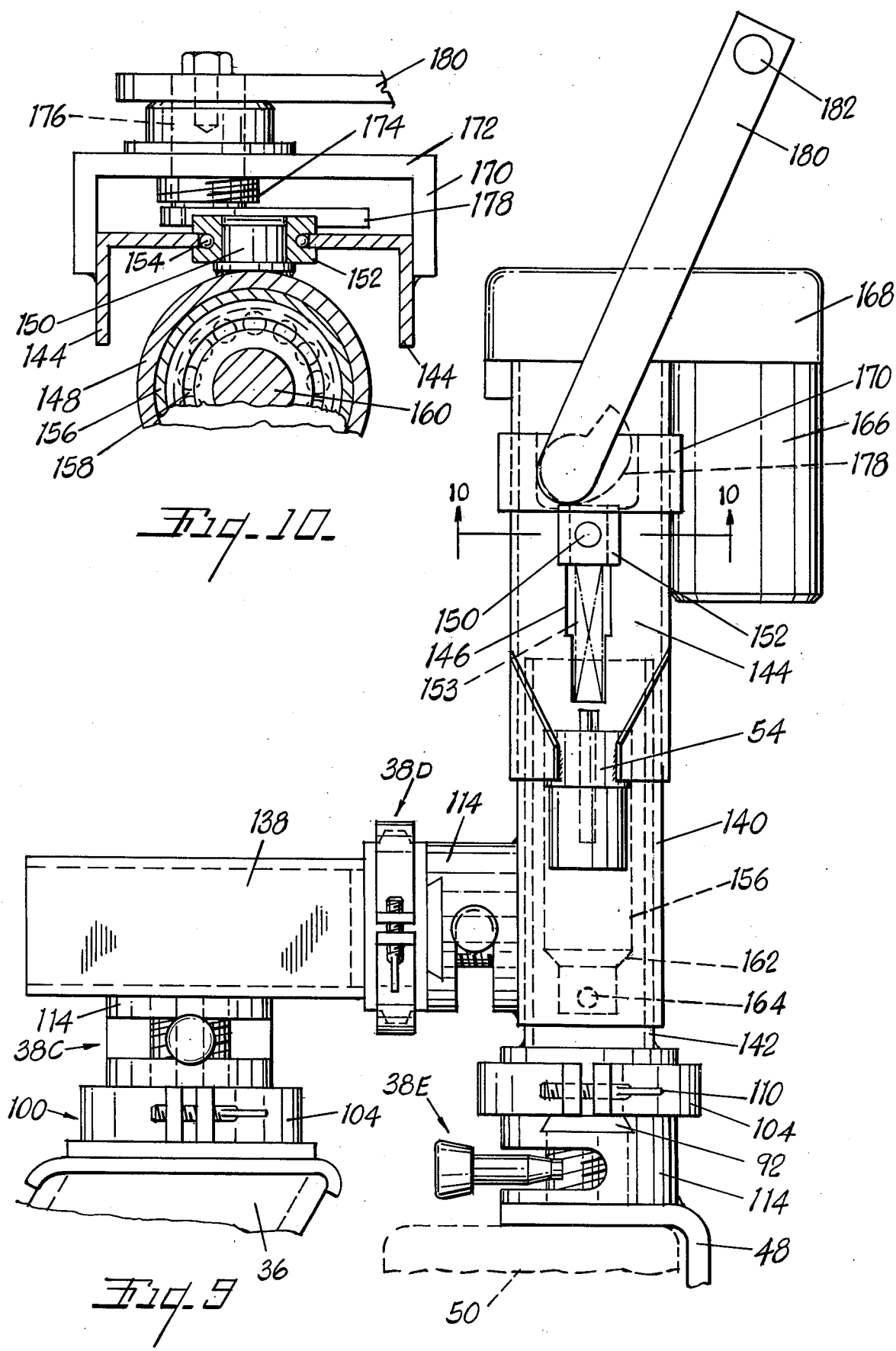

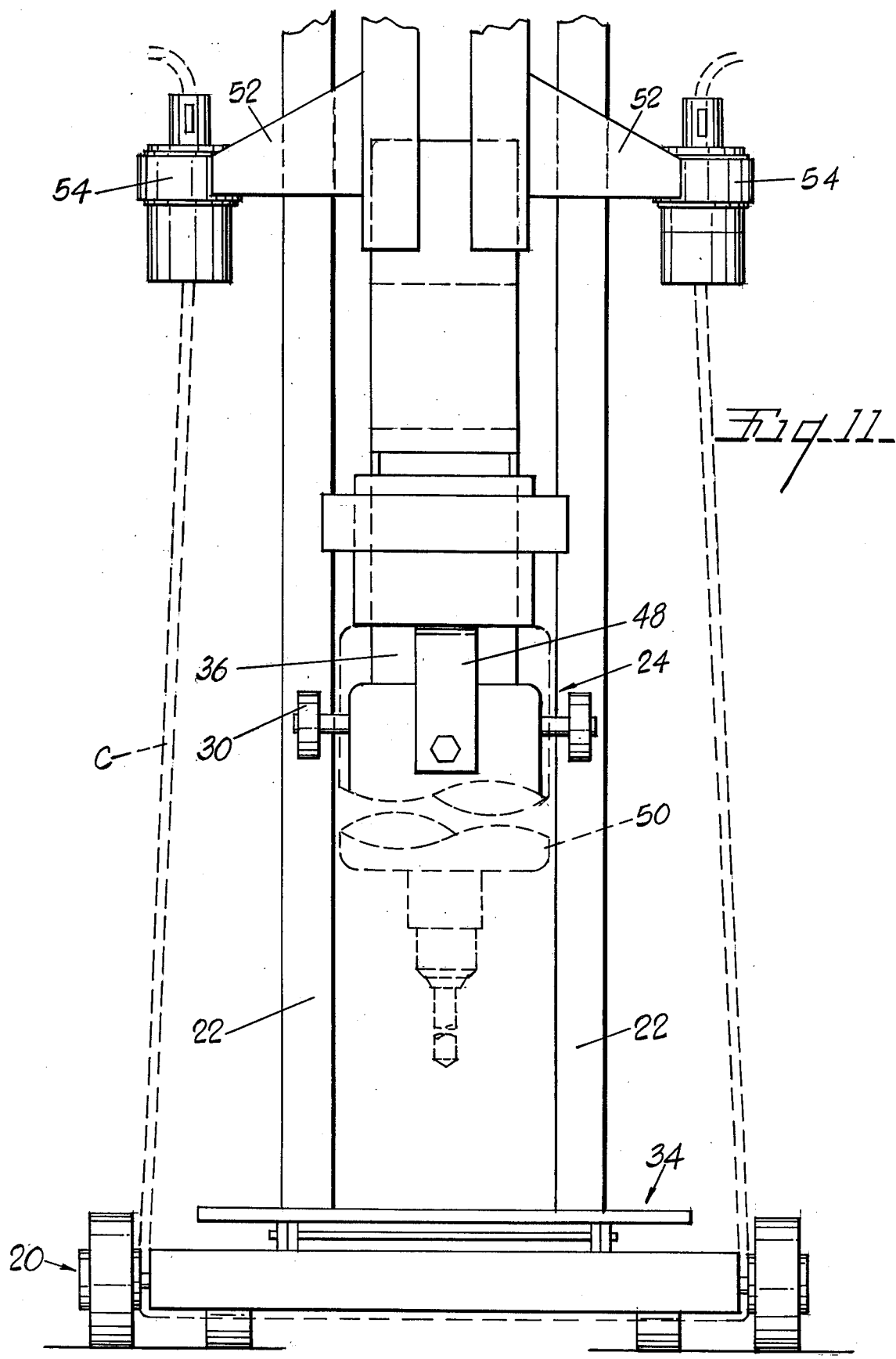

ROTATABLY ADJUSTABLE AND LOCKABLE CONNECTOR

OUTLINE OF INVENTION

This invention is an improvement on that disclosed in my prior U.S. Pat. No. 3,417,949, dated Dec. 24, 1968. The improvement lies in providing greater rigidity of position of the drill by means of cable grippers positioned in the plane of the drill, in all adjusted positions; and in providing rigid angular adjustment of the position of the drill in two perpendicular planes, by means of double lockable dove-tail connector joints. A further improvement is the provision of a third plane of adjustment for the drill, by means of a detachable intermediate support member which fits the lockable joints of the base and the drill support.

The drill support may have manual feed or automatic power feed.

DETAILED DESCRIPTION

The drawings, of which there are six sheets, illustrate a preferred form of the support, with both manual feed and power feed mounts for the drill, and with two selectively detachable intermediate supports.

FIG. 2 is an enlarged fragmentary plan view of the manual feed for the drill, and the grippers for securing tension cables between the drill support and the work.

FIG. 3 is a fragmentary, further enlarged, cross sectional view taken along the plane of the line 3—3 in FIGS. 2 & 4.

FIG. 4 is an enlarged end elevational view of the male gripper portion of the connector on the drill support in FIG. 3.

FIG. 5 is an enlarged, longitudinal, cross sectional view through one of the cable grippers, taken along the plane of the line 5—5 in FIG. 2.

FIG. 6 is an elevational view of the rear end of the gripper shown in FIG. 5.

FIG. 7 is an enlarged end elevational view of one of the female connectors, taken along the plane of the line 7—7 in FIG. 1.

FIG. 8 is a fragmentary cross sectional view through the connector, taken along the line 8—8 in FIG. 7.

FIG. 9 is a fragmentary side elevational view of an interchangeable intermediate connector member between the arm of the support shown in FIG. 1 and a modified, power driven, drill support.

FIG. 10 is an enlarged, fragmentary, cross sectional view of the power drive feed support taken along the plane of the line 10—10 in FIG. 9.

FIG. 11 is a front elevational view of the carriage with the intermediate support and power feed of FIGS. 9 and 10 thereon.

Figure 1:
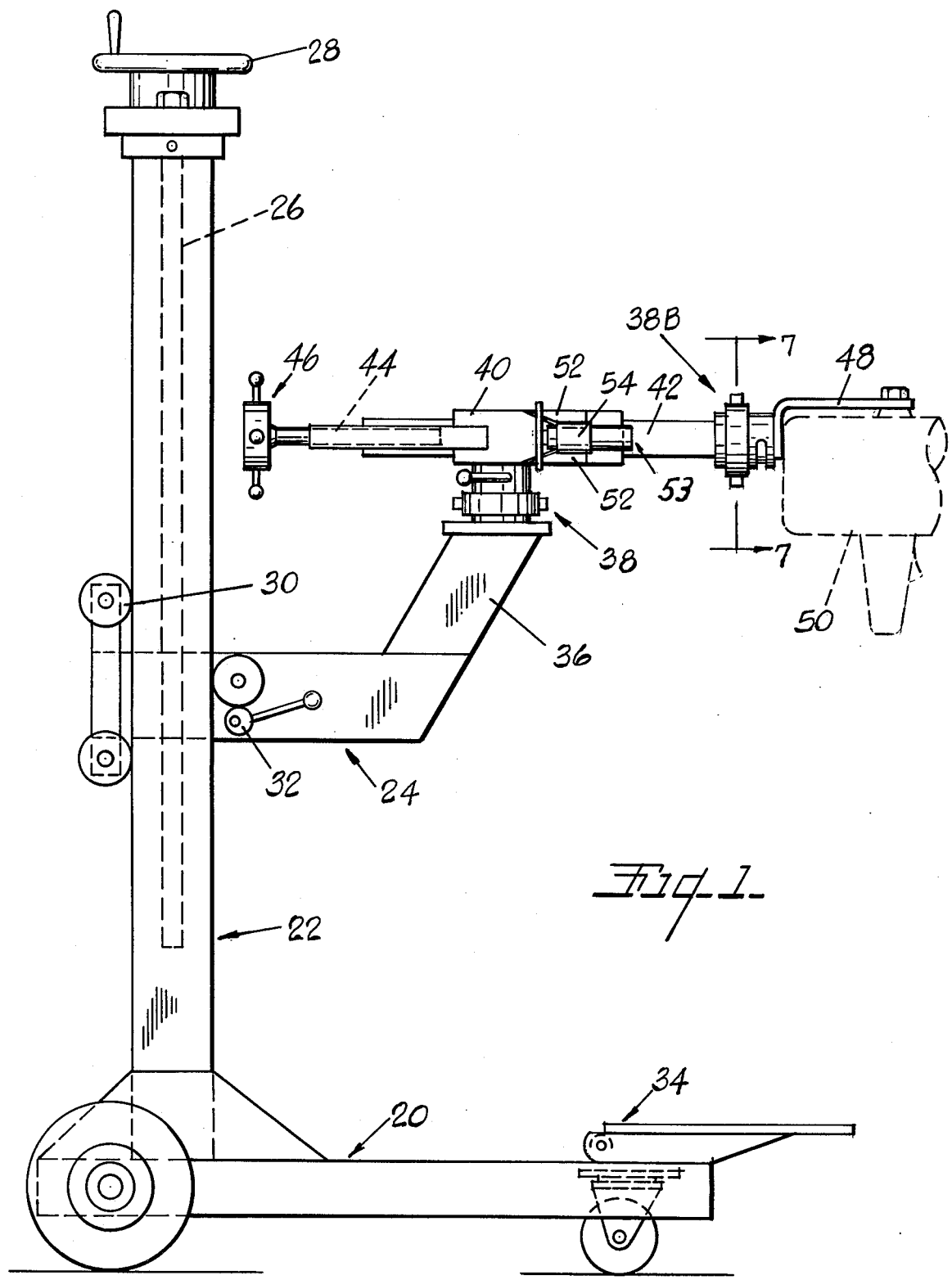
FIG. 1 is a side elevational view of a manual feed support for the drill mounted on a wheeled carriage.

As is shown generally in FIG. 1, the drill support comprises a wheeled base 20, with an upright column 22 near its rear edge. A main support arm 24 is movable vertically by a lift screw 26 operated by a hand wheel 28. Motion is guided by rollers 30, and the arm may be clamped in vertically adjusted positions by an eccentric clamp 32. An alternative work support platform 34 pivoted near the forward or right edge of the base may be folded back when not needed.

The outer right end of the arm 24 carries an inclined strut 36 on the top of which is mounted a first angularly adjustable and selectively releasable connector assembly indicated generally at 38. The upper part of the assembly is fixedly secured to a feed screw support tube 40 which will be described in greater detail presently. An inner slide tube 42 is adjustable axially of the support 40 by a feed screw 44 which in this example is manually operable by the hand wheel 46.

Secured to the outer end of the slide tube 42 is a second angularly adjustable and releasable connector assembly indicated generally at 38B. The assemblies 38, 38B and others to be described presently are similar. It is noted at this time that connector assembly 38 adjusts about an upright or vertical axis, while assembly 38B adjusts angularly about a horizontal axis; and that the axes intersect within the support tube 40. An adjustable and removable part of assembly 38B includes an angled drill support bracket 48 which is adapted to be releasably connected to a conventional electric drill shown by the broken lines at 50. The feed screw support tube 40 and the slide 42 are of rectangular cross section.

Mounted on the sides of the screw support tube 40, by means of laterally converging wing plates 52, are two tubular cable grippers 53 which are shown more particularly in FIGS. 5 and 6. It is pointed out here that stranded steel cables attached to the work, or one cable wrapped around the work, may have their ends passed through the grippers where they may be pulled tight in the same general plane as the bit of the drill 50 and on opposite sides of the bit axis. As a result of the location of the grippers, the pressure of the drill against the work as the drill is advanced by the feed screw can only tighten the drill and its supporting carriage with respect to the work; thus assuring accurate drilling.

FIGS. 5 and 6 show the details of the cable gripper 53. The wing plates 52 are welded to the periphery of a cylindrical bushing 54 which receives the rear body part 56. The forward end of part 56 has a threaded neck 58 that receives the rear end of a forward tube part 60. The interiors of both parts 56 and 60 are provided with forwardly tapering necks 62. Slidably received into both necks is a release tube 64 with a handle 66 on its rear end. A spring 68 urges the tube forward; and two sets of three angularly spaced holes hold six gripper balls 70 between the surface of a stranded anchor cable shown by dotted lines at C and the tapered surfaces 62. Once cable C is tensioned through the gripper, the six balls seat in each groove of a strand cable, and the drill support cannot be moved relative to the work until the handles 66 are pulled back.

FIGS. 2, 3 and 4 show the angularly adjustable portions of the connector assemblies 38 and 38B. A relatively fixed circular or disc part 72 has a rectangular projection or neck 74 which is pressed into the end of the inner slide 42, which is of rectangular cross section. The tube is welded to the disc as at 76.

The disc 72 has a central bore slidably receiving and rigidly guiding the shank of a bolt 78. A spring 80 sleeved around the inner end of the bolt is compressed between the abutment nut 82 and the inner side of the disc. The head 84 of the nut is press fitted into a socket in a circular indexing plate 86, which is thus held firmly but yieldably against the disc 72. The periphery of the disc 72 has a tapered rim 88 therearound which mates with an oppositely tapered rim 90 on plate 86. Secured to the outer face of the indexing plate is a dove-tail plate 92 secured in diametrical relation across the index plate by screws 94, and under-cut as at 96. It is apparent that any part clamped against the plate 72 by the male dove-tail 92 may be rotated through 360 degrees about the axis of the tool support slide 42 and locked in position. Attention is invited to the recessed taper 98 in the male dove-tail, centered on the head 84 of the bolt 78.

A split clamp ring, indicated generally at 100, has opposed sides 102 and 104 pivoted together by the pivot 106 through ears 108. Opposite ears 110 can be drawn together by a clamp screw 112. (See FIG. 4). The inner surfaces of the sides of the ring parts 102 and 104 define sectors of inner tapered circles that engage the tapered rims 88 and 90 on the plates 72 and 86. Infinite angular adjustment of the male dove-tail part 92 is thus possible.

The releasable female part of the connections 38 and 38B is shown most clearly in FIGS. 7 and 8. It consists of a cylindrical block 114 with a dove-tail slot 116 formed diametrically across its inner face, and sized to fit snuggly over the male dove-tail rib 92. The opposite face of the block is permanently connected to the part to be adjustably and removably connected to the male portion 92 of the connection 38. In FIGS. 7 and 8 the block is shown welded to the drill support bracket 48. The center of the block defines an internally tapped axial bore 118 within which is positioned an externally threaded clamp plug 120. Note that the diameter of the plug is sized to permit assembly through the slot 116. Note also the tapered nose 122 on the plug which seats with a centering action in the tapered recess 98 in the dove-tail 92.

A slot, roughly one third of the thickness of the block in width, is cut transversely into the side of the block as at 124. The slot extends, parallel to the ends of the block to beyond the axis of the block, and thus intersects the bore 118 and its threads. The rear face (right in FIG. 8) of the plug 120 is recessed as at 126, and an axial slot 128 is formed in its periphery thus intersecting both the threads and the recess of the plug. Diametrically opposite the slot 128, the wall of the plug is provided with an internally threaded radial bore 130. The sides of the slot 128 are conically tapered along the axis of the bore 130 as at 132. Extending radially into the slot 124 in the block, and through the axial slot 128 in the plug is a clamp and lock pin 134, with its threaded inner end engaged in the threaded bore 130. Note that the pin 134 may swing through approximately 180 degrees in the slot 124 in block 114. By pre-positioning the threaded plug 120 with its outer face near the face of slot 116 and the bore 130 opposite the slot 124, the pin 134 can be passed radially through the slots and threaded into bore 130. It can then act as a clamp lever to tighten the clamp plug against the male dove-tail. After the dove-tail is clamped, rotation of the lock pin about its axis and into the threaded bore 130 draws an enlarged taper 136 on the pin between the tapers 132 in the plug, spreading the sides of slot 128 and locking the threads on the plug into the threads in bore 118. No amount of vibration in the drill or the work can then cause the dove-tail connection to loosen or shift. Note that the taper 122 on the plug 120 has a co-acting, self-centering action with the tapered face 98 in the center of the dove-tail plate 92, thus centering the male and female parts of the dove-tail.

FIGS. 9 and 10 illustrate a modification and an alternative mounting for the drill support. A relatively short intermediate tubular support 138 of rectangular cross section has the female dove-tail body 114 of a third adjustable and releasable connection 38C secured to its underside; to co-act with the male dove-tail part 92 of connection 38 on the strut 36 in FIG. 1. Mounted on a horizontally projecting end of the intermediate support is a fourth releasable connection 38D having the same adjustable male dove-tail 92 as that of connection 38B in FIG. 1. The releasable clamp and cylindrical block 114 of connection 38D is secured to one side of a tubular rectangular tool feed support 140, which is angularly adjustable about the axis of connection 38D in a vertical plane. A drill feed slide 142 also of rectangular tubular cross section is reciprocable in the support tube by means which will be described presently. On its end, which is downward in the position illustrated, the feed slide 142 carries the male dove-tail part 92 of a fourth releasable gripper connection 38E. The cylindrical body or block 114 may be the same one as that shown in FIGS. 1, 7 and 8 which supports the drill 50. Connection 38D may be attached directly to connection 38 in FIG. 1, if desired.

The modified power tool feed of FIGS. 9 and 10 has cable grippers 54 on each side the same as those shown in FIGS. 1 and 2. These are attached to oppose C-shaped brackets 144 having their flanges welded to the top and bottom of the tubular support 140, with their webs defining longitudinal slots 146 at their rear ends. Positioned between the brackets 144 is a tubular, cylindrical, feed screw support 148 having trunnions 150 welded to each side. The trunnions are engaged in cross-head slides 152 with slotted edges which travel along the edges of the slots 146. Springs 153 bias the cross-head slides upwardly. Bearings 154 roll in the slots for smooth travel. Within the screw support 148 is the cylindrical slide 156 of a power driven tool feed. A circulating ball screw nut 158 held in the rear of the slide tube by a jamb nut (not shown) causes the slide tube 156 to move axially upon rotation of a driven screw 160. The outer or lower end of the tube 156 carries an end plug 162 which is connected to the rectangular tubular slide 142 by a cross pin 164. The screw 160 is driven by a motor 166 through a gear box 168. The power driven tool feed, including the cylinder 148, trunnions 150, slide 156 and circulating ball nut 158, screw 160, motor 166 and gear box 168 are parts of a commercially available power drive unit and so are not disclosed or described in greater detail. By means of suitable controls (not illustrated) the drive unit can force the pin 164 and in turn the rectangular tubular support 142 downwardly or retract it upwardly as shown in FIG. 9.

Welded to the channel plates 144 near the backs or upper ends thereof are opposed C-clips 170 with their webs 172 spaced outwardly from the channel plates. A tubular bushing 174 is threaded through each clip just rearwardly of the slots 146, and supports a short cam shaft 176 extending through each bushing and rotatably carrying a cam 178 in abutting relation to the rear or upper ends of the cross-head slides 152. Levers 180 connected to the outer ends of the cam shafts 176 are connected by a common cross bar handle 182.

With the drill support as a whole adjusted to the desired location and position as shown in FIG. 9, the drill 50 may be advanced and retracted by either or both actuation of the motor 166 and the handle 182. It is anticipated that the handle 182 and cams 178 will be used primarily to "spot" or test the location of the drill bit, and that thereafter the power feed will be actuated to complete the drilling. However, when drilling holes in thin material, the cams 178 and handle 182 may be used to complete the hole without activating the motor 166.

Operation

In all operating positions of either the manual feed shown in FIG. 9, the cable grippers 54 lie in a plane which includes the axis of the bit of the drill 50, and on opposite sides of the axis. It will be evident that cables C when anchored to the work and drawn tight through the grippers as shown in FIGS. 5 and 6 will rigidify the position of the drill 48 and its line of feed. With the alternate intermediate tubular support 138 mounted on the strut 36, and either the manual feed of support tube 40 or modified tube 140 of the power feed attached thereto, the drill 50 can be adjusted and fed vertically. The platform 34 can be folded out as shown, and work may be brought to the carriage 20 instead of vice-versa. Anchor cables connected between the sides of the platform and the grippers act as stabilizing guys, and the drill may be utilized as a drill press. By raising the arm 24 and strut 36 on the carriage 20, and interposing the intermediate support tube 138, the drill support, with either manual feed or power feed, provides the function of a drill press with a very wide or high throat above the platform.

The several dove-tail connections 38 permit quick adjustment of position and interchange of parts of the support, while maintaining rigid connections in all positions. Both modifications, in FIG. 1 and FIG. 9, permit orbital adjustment of the position of the drill 50 through 360 degrees about the vertical axis of connections 38 and 38C, as well as angular adjustment of the body of the drill about the drill bit axis to clear obstructions. The addition of the intermediate support and dove-tail connection 38D adds a third plane of adjustment about the horizontal axis.

While the male dove-tail parts 92 of the connections 38 are shown on the parts of the assembly closest to the strut 36, the positions of these could be reversed with the female parts 114 if desired. The quick release and self-centering actions of the clamp or locking plugs 120 provide rigidity for the connections; and cooperate with the split clamp rings 100 which determine the angular adjustments of the connections.

What is claimed to be new and what is desired to be secured by Letters Patent is defined in the following claims:

1. A releasable and lockable connection between machine elements comprising a first body part adapted to be secured to one element, and another body part adapted to be connected to the other element, said parts having co-acting interengagable dove-tail portions,
   said first body part defining an internally threaded axial bore opening to the face of the dove-tail portion thereof,
   a threaded locking plug received in said axial bore,
   a slot formed part way through said body part and intersecting said bore to expose at least one third of said plug,
   said plug defining a radial bore interrupting part of the threads thereon and having internal threads therein,
   and a lock pin having one end received in said radial bore and projecting from said plug through said slot in said first body part.

2. The releasable connection as defined in claim 1 in which the face of said locking plug has a conically tapered edge centered thereon,
   the dove-tail portion on the other body part having a conically tapered surface formed centrally thereon in mating relation to the tapered edge on said plug.

3. The releasable connection as defined in claim 2 in which the tapered edge on said plug is formed around a male protrusion on the plug, and the mating taper on said other body part is formed as a female recess.

4. The releasable connection as defined in claim 1 in which said body parts have circular rims there around with divergingly tapered surfaces,
   and a diametrically split annular clamp ring having a concavely tapered groove in the inner surfaces of its sectors,
   a pivot pin connecting adjacent ends of said sectors of said ring,
   ears on the other ends of the sectors with aligned bores formed there through tangentially of the ring,
   and a clamp screw passed through one bore and threadedly engaged with the other.

5. The releasable connection as defined in claim 1 in which said other of the body parts comprises a first circular disc with a central bore there through, and adapted to be fixedly secured to one of said machine elements,
   a second circular disc with opposed, circular inner and outer surface, mating with said first disc and having a central bore with an enlarged recess at its outer surface,
   a pivot pin passed through the bores in said discs and having an enlarged head located in said recess in said second disc,
   an abutment nut on the end of said pin,
   and a spring compressed around said pin between said nut and said first disc,
   one of the dove-tail portion of the connection being secured to the outer surface of said second disc.

6. The releasable connection as defined in claim 5 in which said one dove-tail portion is a male dove-tail rib which defines a central opening aligned with said pivot pin,
   said central opening have a tapered edge converging inwardly toward the head of said pin.

* * * * *